J. KEITH.
ROTARY FAN.
APPLICATION FILED DEC. 22, 1908.
935,114.
Patented Sept. 28, 1909.
8 SHEETS—SHEET 1.
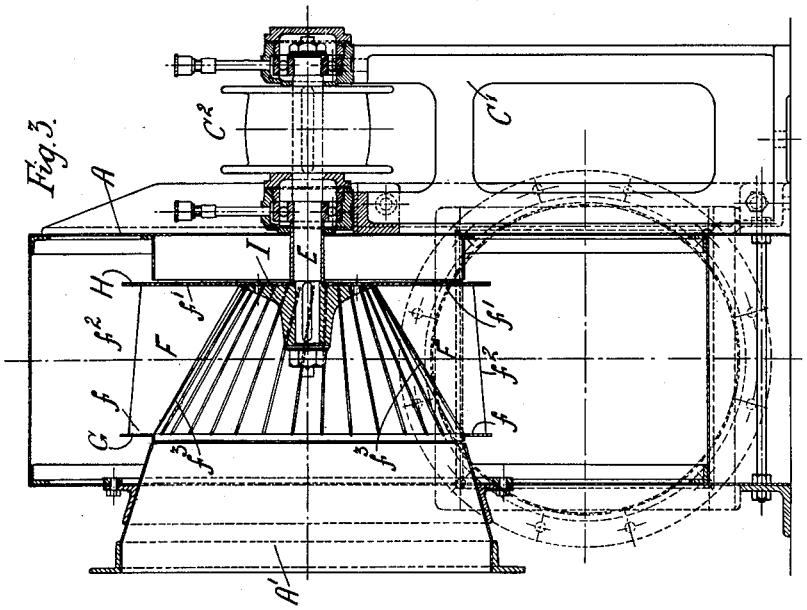
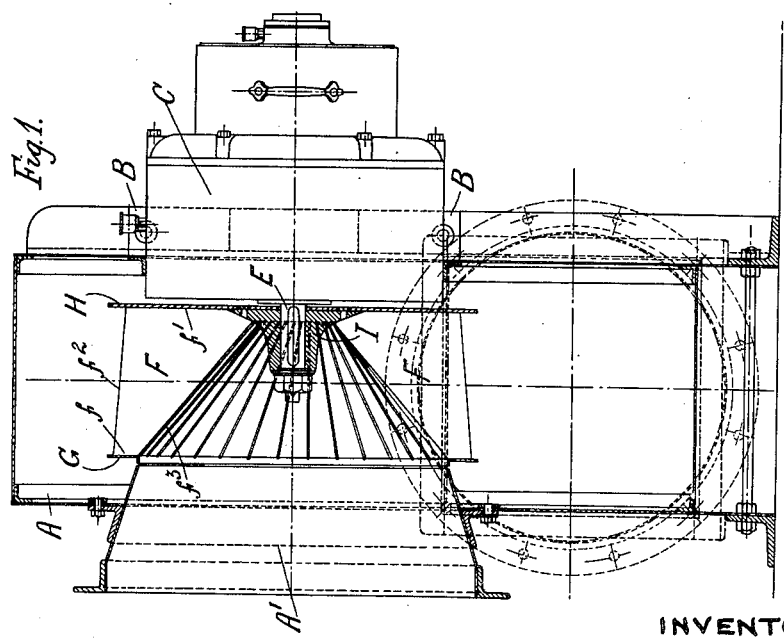
WITNESSES:
INVENTOR,
JAMES KEITH,
by
Attorney.

J. KEITH.
ROTARY FAN.
APPLICATION FILED DEC. 22, 1908.

935,114.

Patented Sept. 28, 1909.
8 SHEETS—SHEET 2.

INVENTOR,
JAMES KEITH,

J. KEITH.
ROTARY FAN.
APPLICATION FILED DEC. 22, 1908.
935,114.
Patented Sept. 28, 1909.
8 SHEETS—SHEET 3.
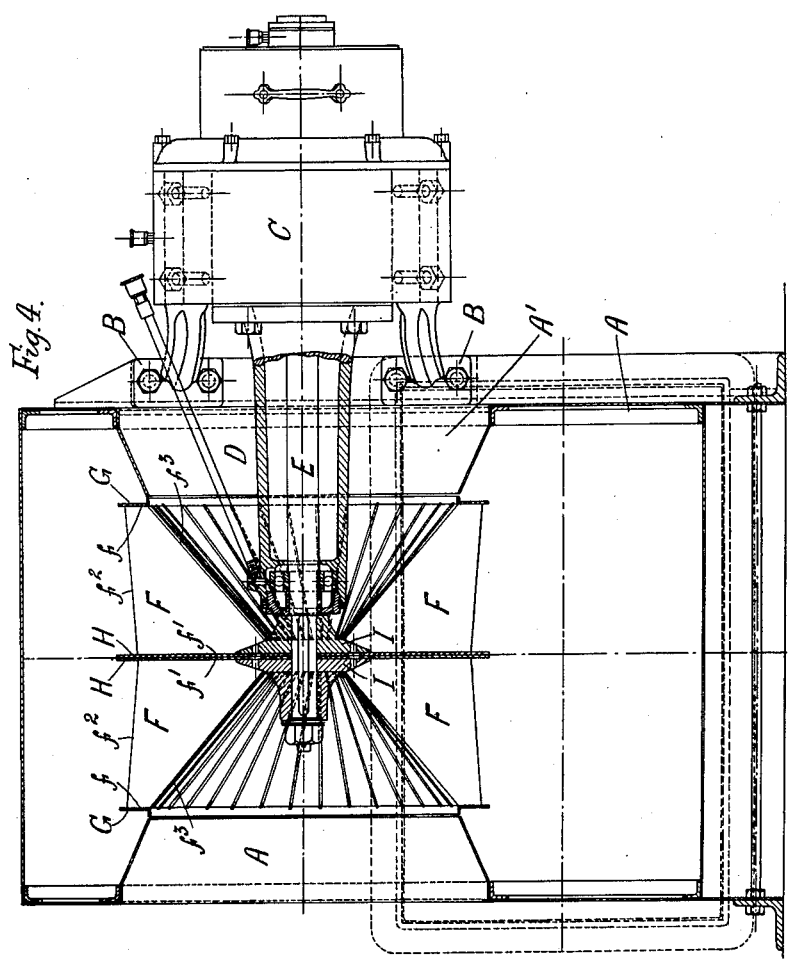
INVENTOR,
JAMES KEITH, J. KEITH.
ROTARY FAN.
APPLICATION FILED DEC. 22, 1908.
935,114.
Patented Sept. 28, 1909.
8 SHEETS—SHEET 4.
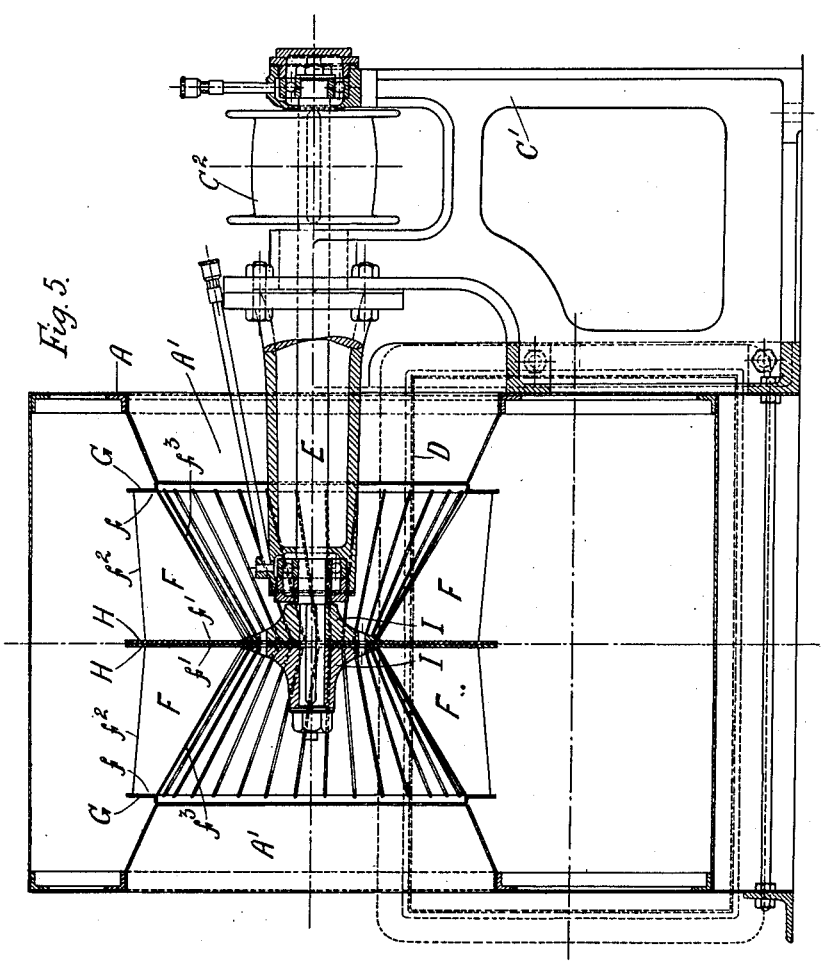
WITNESSES;
INVENTOR,
JAMES KEITH,
by H. Van Oldermul
Attorney.

J. KEITH.
ROTARY FAN.
APPLICATION FILED DEC. 22, 1908.

935,114.

Patented Sept. 28, 1909.
8 SHEETS—SHEET 5.

INVENTOR,
JAMES KEITH,

J. KEITH.
ROTARY FAN.
APPLICATION FILED DEC. 22, 1908.

935,114.

Patented Sept. 28, 1909.
8 SHEETS—SHEET 6.

INVENTOR,
JAMES KEITH,

J. KEITH.
ROTARY FAN.
APPLICATION FILED DEC. 22, 1908.

935,114.

Patented Sept. 28, 1909.
8 SHEETS—SHEET 7.

WITNESSES:

INVENTOR,
JAMES KEITH,
by
Attorney.

J. KEITH.
ROTARY FAN.
APPLICATION FILED DEC. 22, 1908.

935,114.

Patented Sept. 28, 1909.
8 SHEETS—SHEET 8.

INVENTOR,
JAMES KEITH,

UNITED STATES PATENT OFFICE.

JAMES KEITH, OF LONDON, ENGLAND.

ROTARY FAN.

935,114.　　　　　　Specification of Letters Patent.　　Patented Sept. 28, 1909.

Application filed December 22, 1908. Serial No. 468,786.

*To all whom it may concern:*

Be it known that I, JAMES KEITH, a subject of the King of the United Kingdom of Great Britain and Ireland, and residing at London, England, have invented a certain new and useful Improvement in Rotary Fans, of which the following is a specification.

This invention relates to fans and contemplates certain improvements on the arrangements described in the specifications of Letters Patent Nos. 847585 and 877648.

According to the present invention, the fan wheel (of truncated conical form, both externally and internally) is provided with blades of a formation hereinafter more particularly described, the design being such as to combine extreme strength, with lightness and rigidity, and ability to deal with a volume of air with a degree of efficiency not hitherto attained in cased fans under equal conditions as regards size of air inlet or inlets, size of air outlet, size of outside case, water gage, and number of revolutions per minute.

Figure 2:
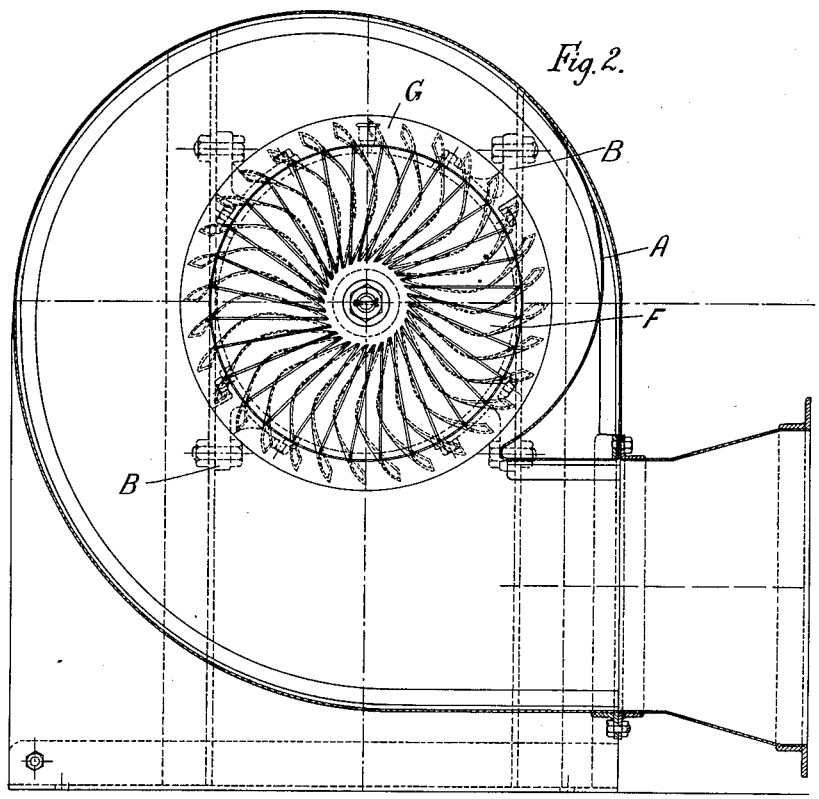
Figure 6:
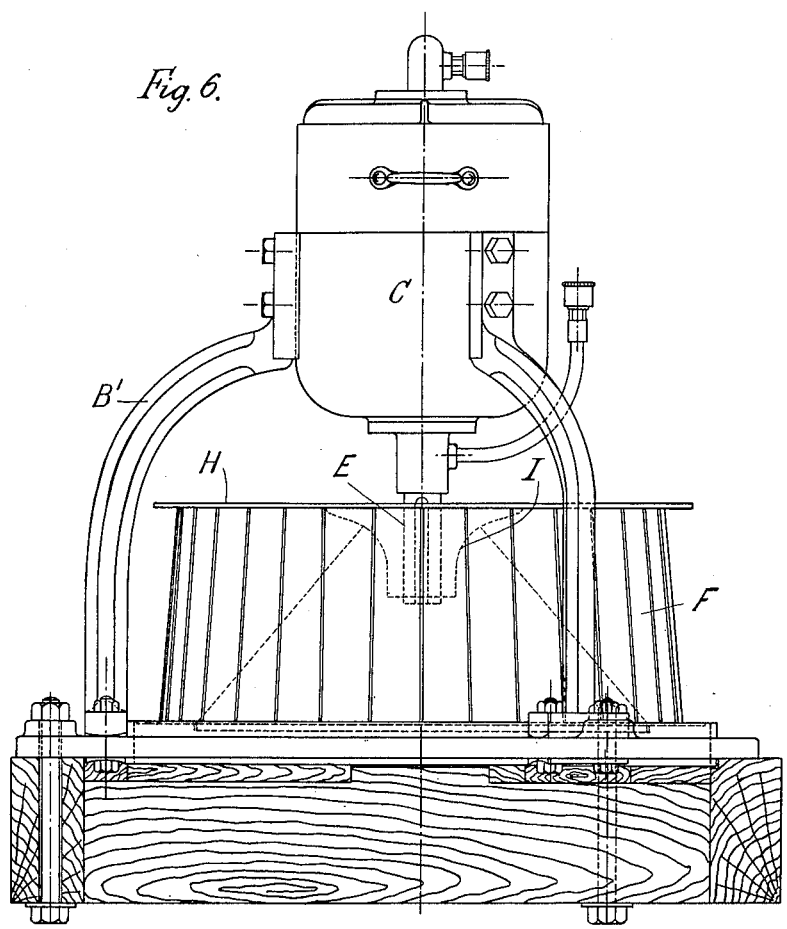
Figure 7:
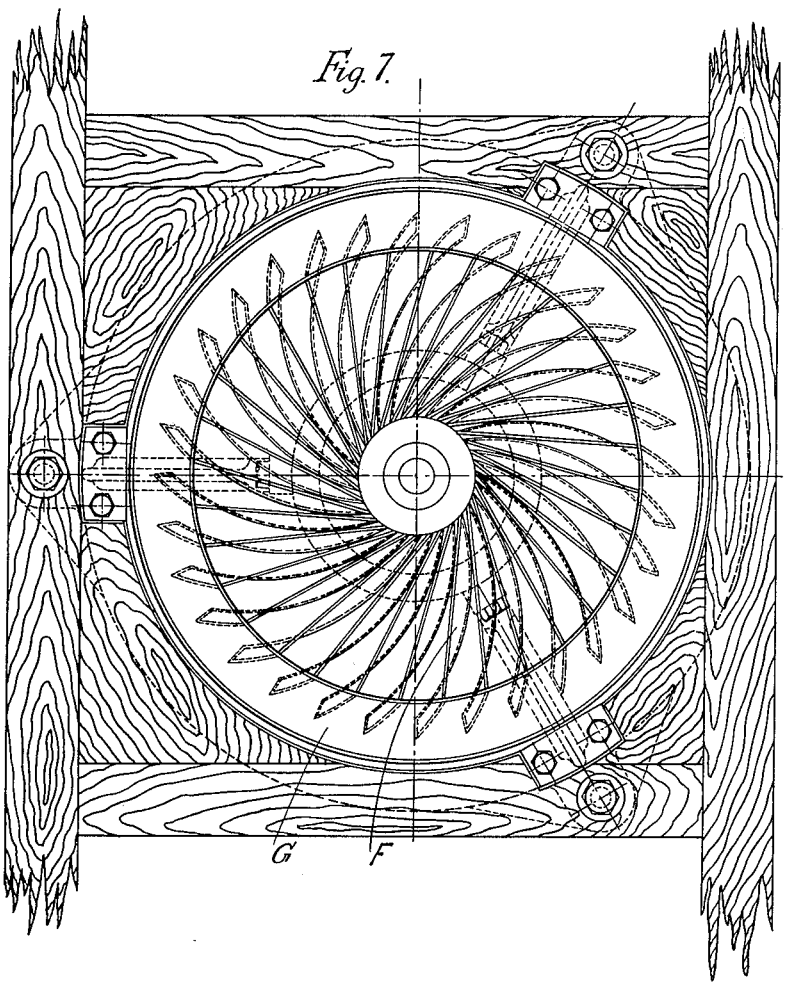
Figure 8:
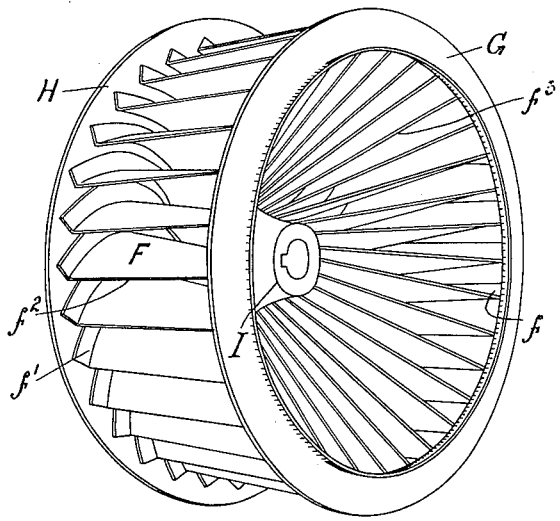
Figure 9:
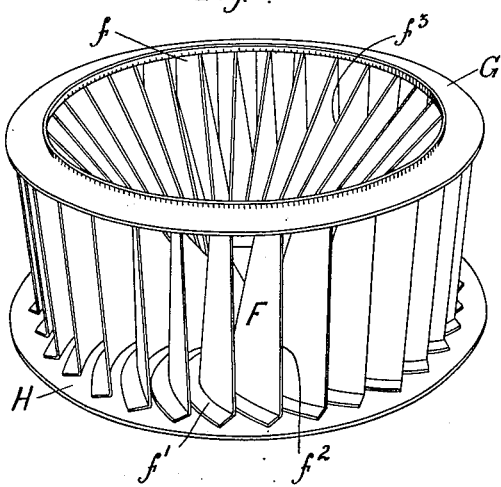
Figure 10:
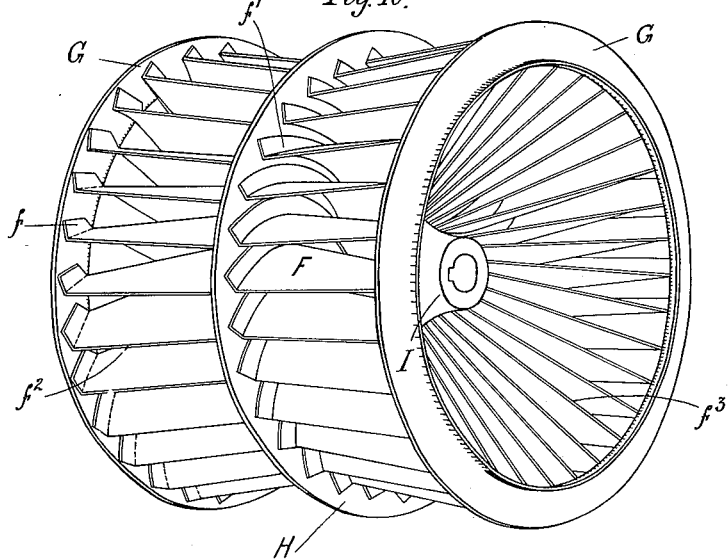
Figure 11:
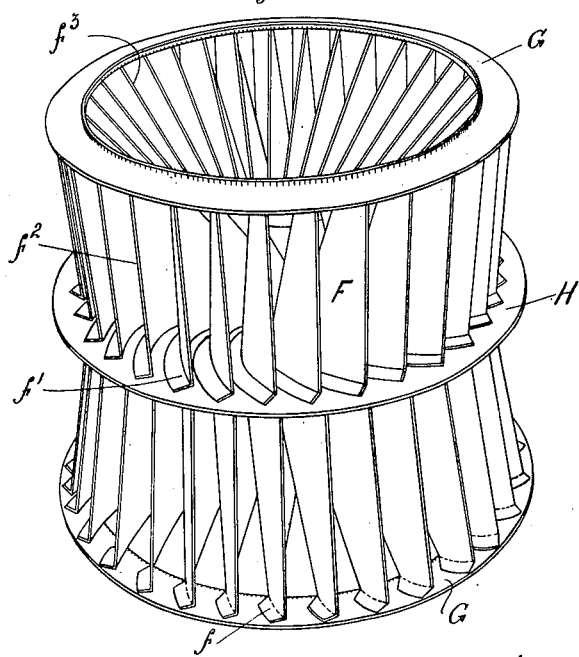

In the accompanying drawings which illustrate the invention Figures 1 and 2 are vertical sections at right angles to each other showing one construction of the new fan having a single air inlet. Fig. 3 is a like view to Fig. 1, but showing the wheel fitted with blades of a different size. Fig. 4 is a view corresponding to Fig. 1 but showing a fan having a double air inlet. Fig. 5 is a like view to Fig. 4 but showing a wheel fitted with blades of another size. Figs. 6 and 7 are an elevation and plan respectively showing a fan of the open type. Figs. 8 and 9 are perspective views of the single air inlet fan wheel shown in Figs. 1 and 2. Figs. 10 and 11 are perspective views of the double air inlet fan wheel shown in Fig. 4.

Like reference characters denote like parts in the several views.

Referring to Figs. 1 and 2, the fan shown therein is of the single air inlet type and may comprise a volute casing A having connected thereto at B the stationary part of an electric motor C, the spindle E of which motor carries the fan wheel. The fan wheel is composed of curved blades F flanged at their ends and connected to a side ring G and to a disk H attached to a boss I secured to the motor spindle E.

The outer edge of the ring G is in register with, and close to, the conical mouth-piece forming the air inlet $A^1$, thus forming one of the recesses "S" indicated in the specification of Letters Patent No. 847585, the disk and the motor together with the wall of the case forming the other recess "S," the presence of which recesses tends to secure balanced running of the fan wheel, absence of thrust, and increased efficiency.

The blades F, the ring G and the disk H are fitted and riveted or electro-rivet-welded or otherwise fastened together so as to give extreme strength and lightness with rigidity, without the use of any internal stays. The parts of the fan wheel are preferably made of light steel, and it is thus possible to build the wheel up to any desired diameter without stays and run it at any practicable speed with absolute safety. The blades F are of conoidal or tapered form; that is, their outer and inner longitudinal edges $f^2$ and $f^3$ are farther apart at one end $f^1$ than at the other end $f$ and are inclined at different angles to their base, the outer longitudinal edges $f^2$ being practically coplanar with the axis of the fan spindle, and the inner longitudinal edges $f^3$ being in planes oblique, relative to the axis of the fan spindle, and the blades are also scooped or curved, without being twisted, the curvature being preferably parabolic or approximately so, the blades being much shallower toward one end $f$ than they are at the other base end $f^1$. Consequently, in addition to the usual scooping, inducing and forcing action, the fan wheel has a screwing action on the air, all of which tend to give the highest possible efficiency.

In a fan of the single air inlet type (Figs. 1 to 3) the diameter of the fan wheel is greater toward the inlet $A^1$ than at the back, while in a fan of the double air inlet type (Figs. 4 and 5) the diameter of the fan wheel is greater toward the air inlets $A^1$ than at the center. In other words the outer and inner longitudinal edges $f^2$, $f^3$ of the blades F lie on conical surfaces differently inclined to the axis of the fan spindle, the wheel being in the form of a truncated cone externally, and the inlet center forming another truncated cone of considerably shallower proportions than the other outer cone. It follows that the blades are located farther apart at the air inlet end than at the back or base in the single air inlet fan, and are located farther apart at the inlet ends than at the center in the double air inlet fan, so that more air will be drawn in or induced at the outer ends of the blades than at the inner ends.

Unlike other forms of single-inlet drum or multiblade volume pressure cased fan wheels having relatively long narrow blades—with which wheels, the strongest current of air is always at the base—or back-ends of the blades, causing much thrust, with a tendency to a recirculation of the air through between the blades at the front end, and thus back into the center inlet of said wheels)—with this novel form of fan wheel, by reason of the varying proportions, different angles, and the conoidal formation of the obliquely set blades, in conjunction with the increased induction toward the front caused by the double truncated conical form of the wheel and the freedom from thrust, the air delivery is equalized along the whole length of the outer blade edges, and there is absolutely no air blow off whatever at any point of the air inlet, as there invariably is at one point or other on the air inlet edges of all other forms of fans.

In the double air inlet type of fan, Fig. 4, the fan wheel is shown as driven by an electric motor C connected to the fan casing at B, the casing of the motor having attached to it a sleeve D affording a bearing for the motor spindle E carrying the fan wheel. The fan wheel is built up of curved blades F connected to side rings G and to a central disk or central disks H attached to a boss or bosses I secured to the motor spindle; the construction being substantially the same as that of the fan wheel of the single air inlet type but made up of two wheels of said single air inlet form with both sets of blades having their concave surfaces set for running in the same direction, said wheels being conjoined; the outer edges of the rings G are in register with, and close to, the mouth pieces forming the air inlets marked A¹ thus forming the two recesses "S" indicated in the specification of Letters Patent No. 847585. As an example, a small cased fan of the new form as illustrated, having only 12½ inch diameter air inlet or inlets, will, at 1000 wheel revolutions per minute, deliver no less than, in the case of a single air inlet, 4400 cubic feet of air per minute, or, in the case of double air inlets, twice that amount of air per minute.

In the application of the invention to an open type of fan (Figs. 6 and 7), the fan wheel spindle E is preferably driven by an electric motor C carried by the arms B¹ of a bracket secured to a ceiling (as shown) or to a wall or other structure. This fan wheel is preferably run in the opposite direction to that shown for the cased fan wheels. The formation of this fan wheel is substantially identical with that of a cased fan of the single inlet type (Fig. 1) a different blade curve being preferably used.

The constructions shown in Figs. 3 and 5 are similar to the constructions shown in Figs. 1 and 4 respectively, except that the blades F of the wheel are not made quite so deep toward the end where the disk or disks is or are located, and the spindle E is supported in bearings in a bracket C¹ adjacent the casing A and driven by a belt pulley C².

A fan with blades such as shown in Figs. 3 and 5 may be preferred for volume work at a comparatively low pressure, say one inch water gage, while a fan with blades such as shown in Figs. 1 and 4 may be preferred for volume work at a pressure above one inch and up to 6 inches water gage.

It goes without saying that all the forms of fan wheels or fans illustrated may be made suitable for other driving, including belt or direct-electric motor driving.

With the smaller types of fans shown in Figs. 3 and 5 it may be preferred to fit the fan case with a bracket for the fan spindle as described in the specification of Letters Patent No. 847585 and shown at B on Fig. 1 of the drawing annexed to said specification.

Having now described my invention what I claim and desire to secure by Letters Patent of the United States is:—

1. In a rotary fan, a fan wheel of truncated conical form internally and externally, said wheel composed of blades of tapered and scoop form, the diameter of the wheel both inside and outside being greatest where the blades are narrowest, the outer and inner longitudinal edges of the blades lying on conical surfaces differently inclined to the axis of the fan spindle, the outer longitudinal edge of each blade being practically coplanar with the axis of the wheel, and the inner longitudinal edges of the blades being in planes oblique relative to said axis.

2. A fan wheel of truncated conical form internally and externally, said wheel composed of blades of tapered and scoop form, the diameter of the wheel both inside and outside being greatest where the blades are narrowest, the outer and inner longitudinal edges of the blades lying on conical surfaces differently inclined to the axis of the fan spindle, the inner longitudinal edges of the blades being in planes oblique relative to said axis, a ring connecting the narrow ends of the blades, and a disk connecting the wide ends of the blades.

3. A fan wheel of truncated conical form internally and externally, said wheel composed of blades of tapered and scoop form, the diameter of the wheel both inside and outside being greatest where the blades are narrowest, the outer and inner longitudinal edges of the blades lying on conical surfaces differently inclined to the axis of the fan spindle, the outer longitudinal edge of each blade being practically coplanar with the axis of the wheel, and the inner longitudinal edges of the blades being in planes oblique relative to said axis, a ring connecting the narrow ends of the blades and a disk connecting the wide ends of the blades.

4. In a rotary fan, the combination with a fixed casing, of a fan wheel rotatably mounted within said casing, said wheel being in the form of a truncated cone both internally and externally and composed of blades of tapered and scoop form, said blades having their outer and inner longitudinal edges lying on conical surfaces differently inclined to the axis of the wheel, the inner longitudinal edges being in planes oblique relative to said axis, the diameter of the wheel both inside and outside being greatest where the blades are narrowest.

5. In a rotary fan, the combination with a fixed casing, of a fan wheel rotatably mounted within said casing, said wheel composed of two conjoined elements each in the form of a truncated cone internally and externally, said wheel being built up of two sets of blades of tapered and scoop form having their concave surfaces set for running in the same direction and having their outer and inner longitudinal edges lying on conical surfaces differently inclined to the axis of the wheel, the inner longitudinal edges being in planes oblique relative to said axis, the diameter of the wheel both inside and outside being greatest where the blades in each set are narrowest.

In testimony whereof I have signed my name to this specification in the presence of two subscribing witnesses.

JAMES KEITH.

Witnesses:
WALLACE CRANSTON FAIRWEATHER,
JOHN MCCLEARY, Jr.